United States Patent [19]

Walker et al.

[11] 3,882,471

[45] May 6, 1975

[54] APPARATUS AND METHOD OF OPERATING A HIGH-DENSITY MEMORY

[75] Inventors: John M. Walker, Springfield, Va.; John M. McIntyre, deceased, late of Big Flats, N.Y., by Betty J. McIntyre, administrator

[73] Assignee: Westinghouse Electric Corporation, Pittsburgh, Pa.

[22] Filed: Apr. 19, 1974

[21] Appl. No.: 462,487

[52] U.S. Cl... 340/173 SP; 340/173 CR; 340/173 R

[51] Int. Cl. .......... G11c 11/26

[58] Field of Search..... 340/173 SP, 173 CR, 173 R

[56] References Cited

UNITED STATES PATENTS

| | | | |
|---|---|---|---|
| 3,362,017 | 1/1968 | Brahm | 340/173 CR |
| 3,584,183 | 6/1971 | Chiaretta | 340/173 CR |

*Primary Examiner*—Terrell W. Fears
*Attorney, Agent, or Firm*—J. B. Hinson

[57] ABSTRACT

This invention relates to the apparatus and method for operating a high-density memory such as a cathode ray tube (CRT) having therein a high-density storage target. The high-density storage target comprises a plurality of storage elements disposed in lines and columns. To provide a high density of storage elements, each column and line is provided with a positioning tab whereby the electron beam used to read, write and erase information upon the storage target, may be positioned accurately with respect to each line and column and to thereby facilitate the accurate positioning of the electron beam with respect to each storage element of the high-density storage target. In particular, this invention is directed toward the method and apparatus for determining which of a great number of storage elements is defective and for removing the positioning tab corresponding to the line in which the defective storage element is located. Thus, in the fabrication of the high-density storage element, an additional number of lines of storage elements are provided so that those lines containing defective storage elements may be disregarded while ensuring that the required number of storage elements is provided. As a result, in order to address a particular storage element, the electron beam is scanned down the required number of tabs in a manner as described above, while the lines containing a defective storage element are ignored. In this manner, a high-density storage target is provided while ensuring that each of the active storage elements capable of being addressed, is operative.

12 Claims, 5 Drawing Figures

APPARATUS AND METHOD OF OPERATING A HIGH-DENSITY MEMORY

BACKGROUND OF THE INVENTION

1. Field of the Invention

This invention relates to the apparatus and method for providing a high-density memory and in particular, to such a memory capable of being incorporated into a CRT as a target element upon which the CRT's electron beam is positioned accurately.

2. Description of the Prior Art

In order to achieve storage of a high information density, the size of each storage element must be made very small. Such a high-density storage memory may be incorporated into a CRT storage tube, wherein the memory is used as a target upon which an electron beam is used to read and write information. In such applications, it is desirable to maintain the overall size of the storage memory as small as possible, while increasing the number of storage elements comprising the storage memory.

However, as the number of storage elements increases and as the overall size of the memory decreases, the problem of manufacturing operative storage elements increases significantly. This problem may be illustrated by describing a typical format of a high-density storage memory. For example, it may be desirable to provide a storage memory with a density of 19 million storage elements. Such a storage memory may take the form of 1,024 memory blocks disposed in an array of 32 × 32 blocks in a square pattern, with each block including 18,432 storage elements disposed in an array of 144 × 128. To dispose such a number of storage elements upon a target area approximately 1.2 inches square, it is required that the width of each storage element is 4$\mu$ and that the center distance therebetween be in the order of 6$\mu$.

One of the significant problems in the manufacture of such memories is the presence of airborne dust. This problem becomes particularly acute when the size of the storage element decreases to that of the particle size of the airborne dust. Even the best available clean rooms (Class 100 clean rooms) have a certain amount of airborne dust particles having a size approximately that of the storage elements. For example, the air in a Class 100 clean room is passed through a filter capable of removing 99.97 percent of the particles with a 0.3$\mu$ diameter. Even in such an environment, dust particles are available which may come to rest upon the storage elements of the memory, thereby rendering them inaccessible to the reading/writing electron beam and therefore inoperative.

Thus, though there are known photolithographic techniques and equipment for manufacturing a high-density storage target, a significant number of the storage elements of such a target are inoperative, due to the presence of either dust or some other difficulty in the manufacturing process. It is contemplated that a computer programmer could write a program such that any line containing a defective storage element is not addressed. However, such a process would require a significant, additional effort in the programming.

SUMMARY OF THE INVENTION

It is therefore an object of this invention to provide a high information density storage memory.

It is a more specific object of this invention to provide a high-density storage element having a plurality of active storage elements, each of which is operative.

These and other objects are accomplished in accordance with the teachings of this invention by providing the apparatus and method for testing a storage memory having a plurality of storage elements disposed in lines and columns, with each line having a positioning tab, for determining which of the storage elements are operative or inoperative, and for removing the positioning tab of those lines in which inoperative elements are detected. It is understood that the storage memory includes a given number of additional lines that are used to be substituted for those lines in which inoperative elements are found in the sense that the inoperative elements are not used and a subsequent line(s) is operatively disposed in its place.

In an illustrative embodiment of this invention, the storage memory takes the form of a CRT storage tube having a target comprised of a high density of capacitive storage elements disposed in lines and columns. Each line (and column) of capacitive storage elements has a positioning tab which is scanned by the CRT electron beam to provide a horizontal or vertical line count whereby the electron beam is positioned accurately with respect to each storage element of the storage memory target. In testing each of the capacitive storage elements, a test signal illustratively comprising a series of "0" and "1" signals is "written" upon each line of the storage memory target, whereby alternate storage elements have 0 and 1 capacitive charges stored thereon. The charges so stored are "read" by a subsequent scan of the electron beam to provide a signal, which is compared with the original test signal. A coincidence between the read signal and the original test signal indicates that the capacitive storage element is operative; however, a lack of coincidence at any point within a line indicates that the corresponding storage element is inoperative. Upon the detection of an inoperative storage element, the electron beam is directed onto the positioning tab corresponding to that line and is removed by increasing the electron density of the beam to sublimate the electrically conductive material of the positioning tab. Thus, by removing the positioning tabs corresponding to the lines with defective elements therein, the electron beam may be addressed by scanning the remaining positioning tabs and by using an output signal derived from the positioning tabs to address the electron beam to the desired capacitive storage element of the target.

BRIEF DESCRIPTION OF THE DRAWINGS

These and other objects and advantages of the present invention will become more apparent by referring to the following detailed description and accompanying drawings, in which.

DESCRIPTION OF THE PREFERRED EMBODIMENTS

Figure 1:
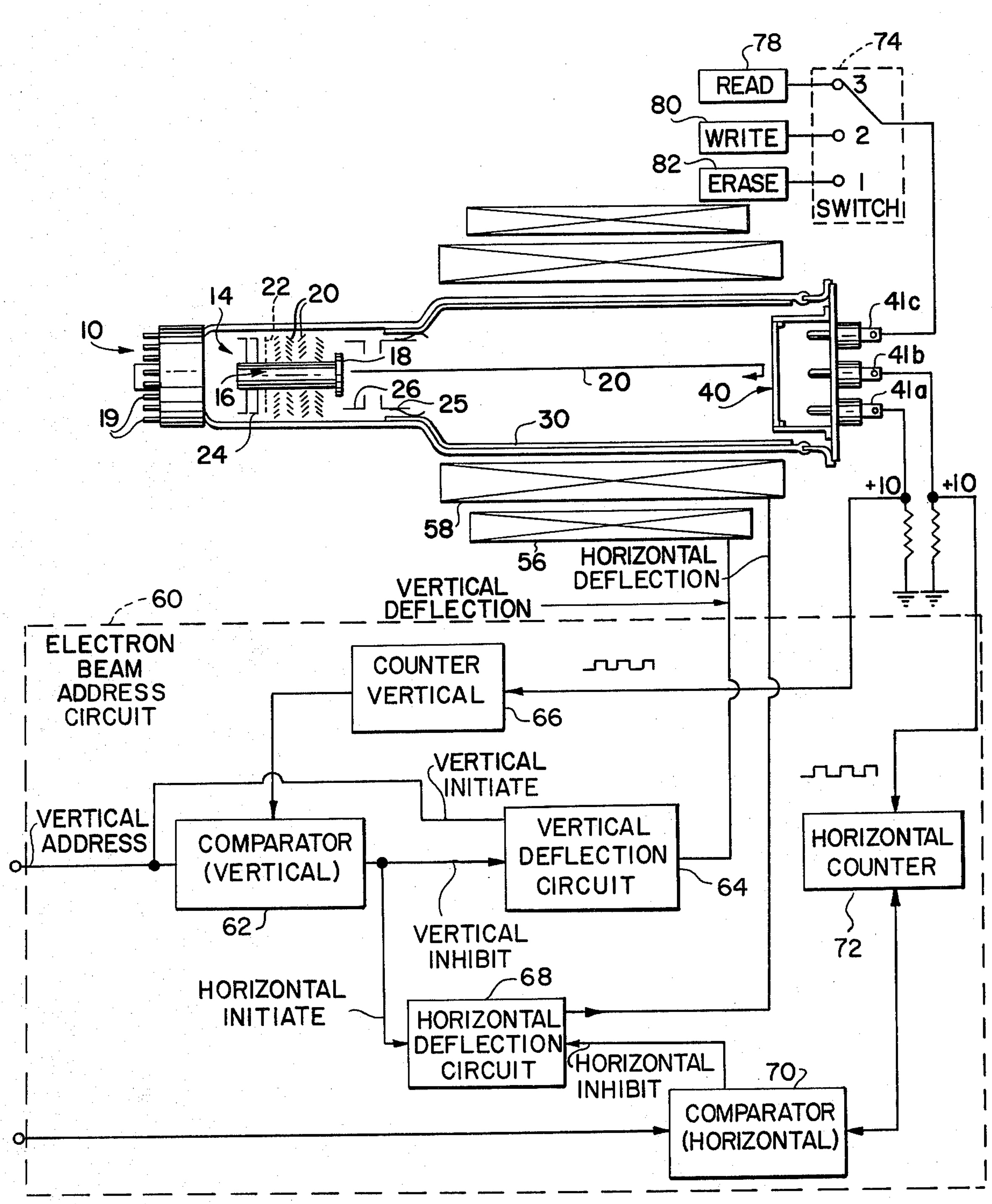
FIG. 1 is a schematic diagram for explaining the manner of addressing an electron beam onto a storage target element disposed within a CRT storage device.

With respect to the drawings and in particular to FIG. 1, there is shown a schematic diagram of a CRT storage tube 10 and an electron beam address circuit 60 for accurately positioning an electron beam upon a high-density storage target 40, e.g. 19 million storage elements. First, the storage tube 10 will be described in detail, and the electron beam address circuit 60 will be discussed at a later point. The CRT storage tube 10 includes an envelope 12 in which there is disposed an electron gun-return beam electron multiplier assembly 14 including an electron gun 16 typically taking the form of a thermionic cathode element (not shown) and a control grid 18 for emitting and directing an electron beam 20 onto the storage target 40, and a high-resolution return beam electron multiplier including a plurality of venetian blind multiplier elements 20 disposed to multiply successively the return beam of electrons, an accelerator grid 22 and a collector electrode 24 upon which the multiplied, returned beam of electrons is collected to provide an output signal indicative of the information stored upon the target 40. Though not shown in FIG. 1, it is understood that the various electrodes of the assembly 16 are connected to selected ones of the terminal pins 19. The electron beam 20 emitted by the electron gun 18 is focused by an annularly-shaped electrode 26 and a wall electrode 30 onto the storage target 40. The storage target 40 is mounted, as illustratively shown in FIG. 1, and the storage elements and other electrodes thereof are connected to selected ones of the electrodes 41, as will be explained later in detail. The electron beam 20 is scanned selectively by the horizontal and vertical deflection coils 58 and 56.

The terminal 41*c* is connected between a grid (to be described later) of storage target 40, and a switch 74, which is disposable in one of three positions correpsonding to the read, write or erase sources 78, 80 or 82, respectively, to effect the desired operation of the storage tube 10. In the read mode of operation, charges previously stored upon the target 40 reflect the electron beam 20 back toward the assembly 14. The return beam of electrons is focused by an electrode 26 onto the multiplier elements 20, to be multiplied subsequently and collected by the electrode 24 to provide an output signal indicative of the information stored upon the target 40.

Figure 2:
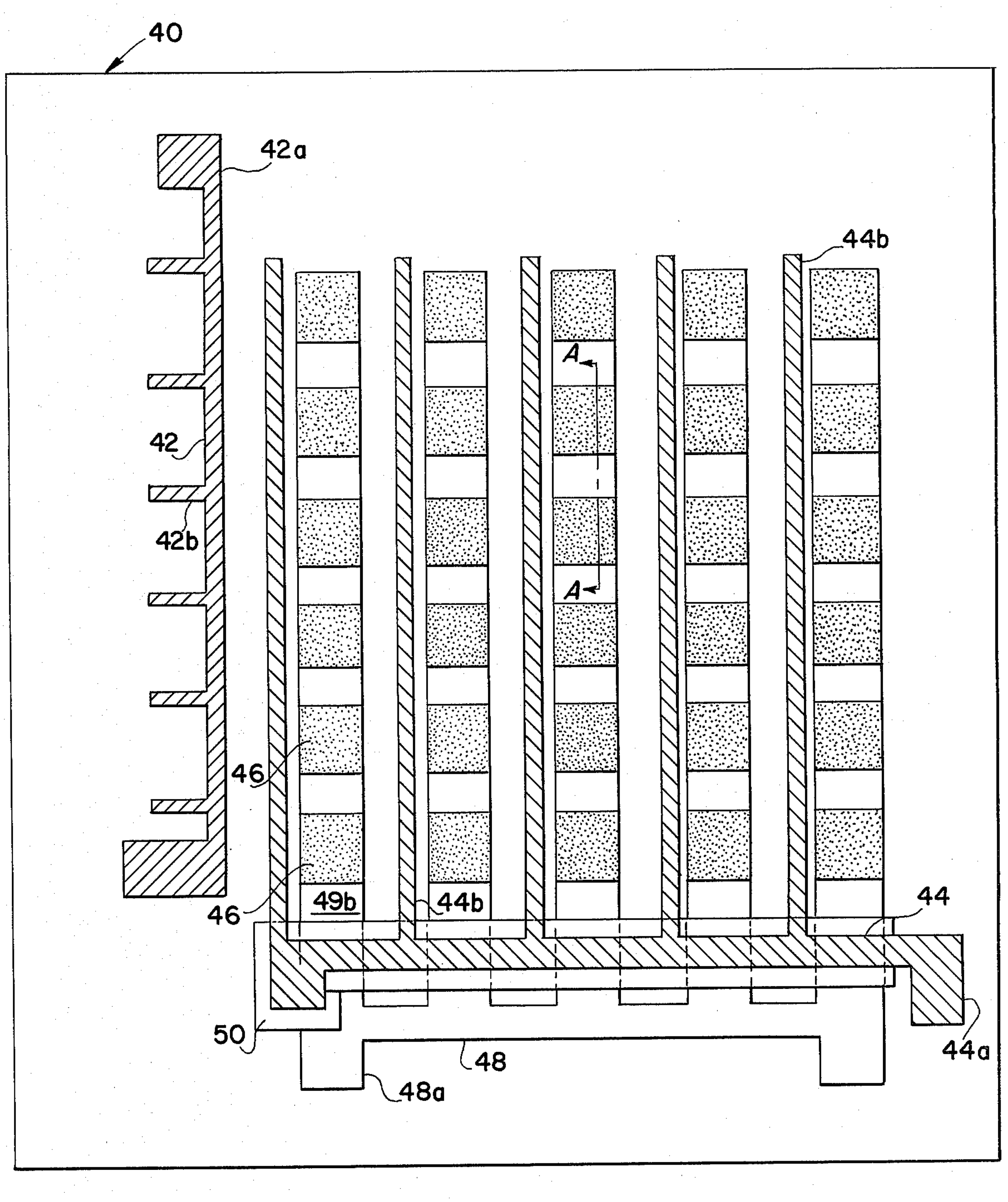
FIG. 2 is a plan view of the storage target shown in FIG. 1 and including positioning tabs for each line and column thereof, in accordance with teachings of this invention.
Figure 3:
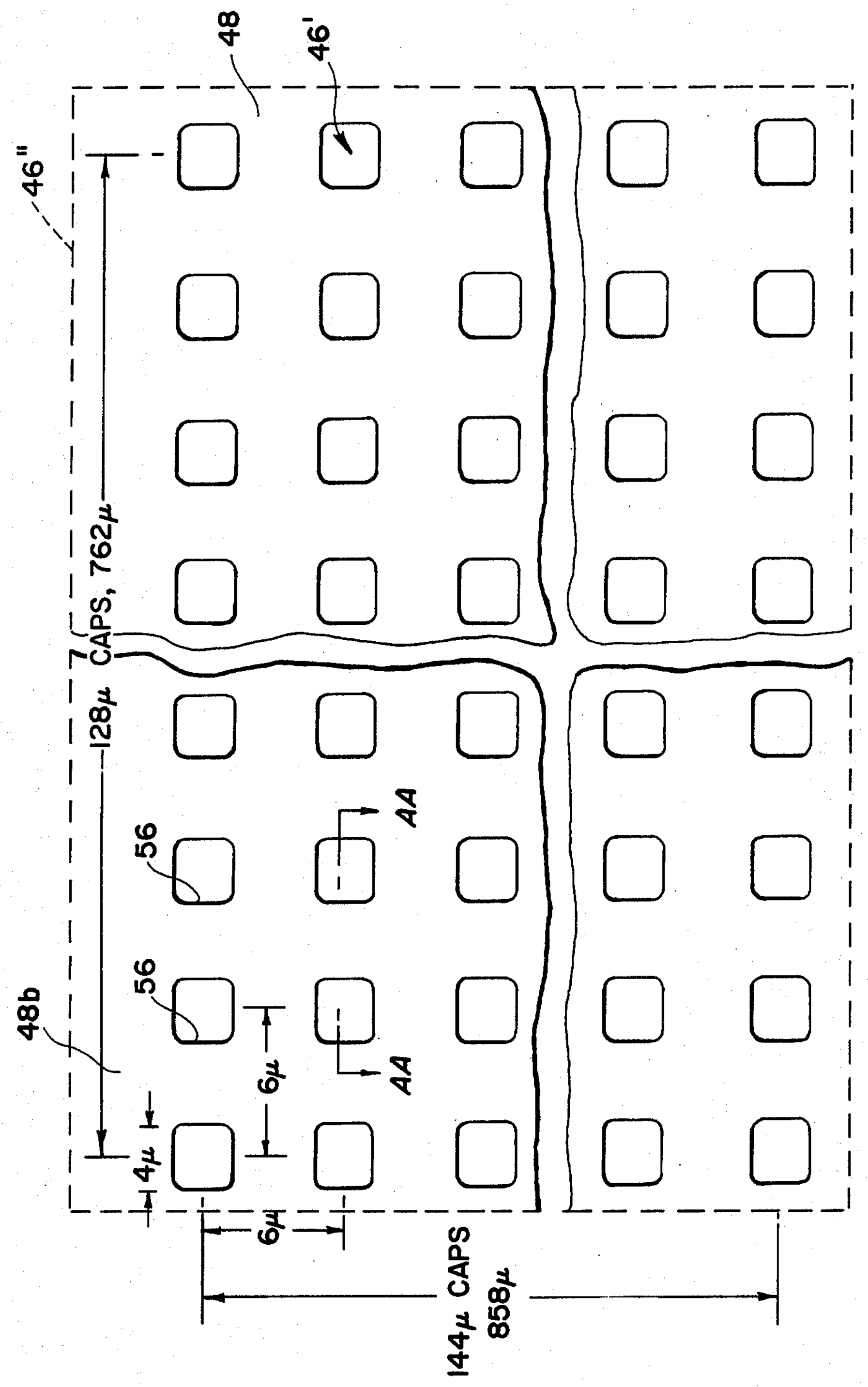
FIG. 3 is a magnified view of one alternative embodiment of this invention in which each of the elements generally shown in FIG. 2 comprises a block of capacitive storage elements.
Figure 4:
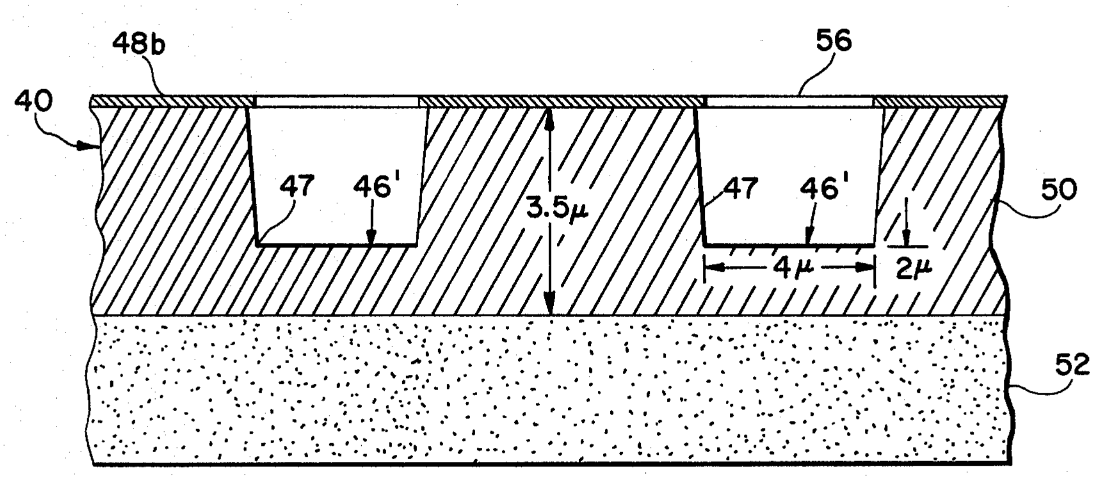
FIG. 4 is a sectioned view taken along either line A—A or line AA—AA of FIGS. 2 and 3, respectively, showing the structure of a capacitive storage element of the storage memory target shown therein.

With regard to FIG. 2, there is shown a plan view of the high-density storage target 40 as incorporated into the CRT storage tube 10, depicted in FIG. 1. The storage target 40 includes a plurality of storage members 46 which may take the form of a block 46'' of capacitive storage elements as shown in FIG. 3 or for the purposes of simplifying the explanation of this invention, may be considered to comprise but a single capacitive storage element 46' as shown in FIG. 4. In particular, the storage members 46 are disposed in an array of lines and columns. The columns of storage members 46 are connected to a top conductor assembly 48 comprising a plurality of finger-shaped members 48*b* extending vertically and electrically interconnecting each storage member 46. Further, the top conductor assembly 48 includes at least one bonding pad 48*a* whereby an electrical connection (not shown) may be made between the top conductor assembly 48 and the electrical terminal 41*c*, as shown in FIG. 1.

Accurate positioning of the electron beam onto the exposed surface of the storage target 40 is facilitated by a first plurality of vertical positioning bars 42*b*, each interconnected by a common conductive bar 42, and a second plurality of horizontal positioning tabs 44*b*, each connected in common by a conductive bar 44. The conductive bars 42 and 44 include, respectively, at least one bonding pad 42*a* and 44*a*, which are connected, respectively, to the electrical terminals 41*a* and 41*b*, as shown in FIG. 1. Briefly, the positioning tabs 42*b* and 44*b* provide output signals through their corresponding terminals as the electron beam is scanned thereacross, to provide a count indicative of the position of the electron beam upon the storage target 40. When the desired count is reached in a vertical and then a horizontal direction, the scanning of the electron beam is stopped at the desired storage member 46.

An illustrative, cross-sectional view of the storage target 40 is shown in FIG. 4, depicting the structure of a capacitive, storage element 46'. The storage target 40 includes a substrate layer 52 made of an illustrative material such as silicon. A second layer 50 made of a suitable dielectric material such as silicon dioxide ($SiO_2$) is disposed upon the substrate layer 52. In a manner to be explained in detail later, the capacitive, storage elements 46' are formed by providing recesses within the layer 50, each including a storage surface 47 off-set from the conductive layer 48*b*. The conductive layer 48*b* corresponds to the vertically-disposed, finger-like members shown in FIG. 2, and forms an electrically conductive grid over at least a portion of the storage target 40, having a plurality of openings 56 through which the electron beam is directed onto the remotely-disposed storage surface 47 of the capacitive, storage elements 46'.

In an alternative embodiment as shown in FIG. 3, each of the storage members 46 may comprise the block 46'' of the capacitive, storage elements 46' disposed in an array. The conductive layer 48*b* forms a conductive grid providing the plurality of openings 56 through which the electron beam is directed to each of the capacitive, storage elements 46'. Thus, in accordance with the illustrative embodiment of the invention shown in FIGS. 2 and 3, the storage target 40 may be constructed to comprise approximately 19 million capacitive, storage elements comprising 1,024 memory blocks 46'' disposed in a square pattern of 32 × 32 blocks, each block comprising 18,432 capacitive, storage elements 46' disposed in an array of 142 × 128 lines and columns, as shown in FIG. 3. As illustrated in FIG. 3, the capacitive, storage elements 46' have a width of approximately $4\mu$ and a center-to-center spacing of approximately $6\mu$. Further, the vertical spacing between the blocks 46'' is in the order of 200 micrometers, whereas the vertical spacing therebetween is in the order of 101 micrometers. Such an array of 19 million elements may be disposed upon a target 1.204 inches square.

In order to provide a complete description of an illustrative embodiment of this invention as well as to demonstrate further the problems encountered in the manufacture of a high-density storage target, a description will be provided of an illustrative method of fabricating the storage target 40 as more particularly shown in FIGS. 2, 3 and 4. In general, thin films 50 and 48*b* of silicon dioxide and aluminum are formed on a silicon substrate 52, and holes or openings 56 are etched in the desired array through a resist and an aluminum film mask into the oxide layer to the desired depth. In order to form the desired pattern of storage elements onto the storage surface, three primary components are needed: an objective screen, a lens screen and a storage plate. Briefly, the objective screen will be manufactured to provide a master plate or mask comprising a 144 × 128 array of openings corresponding to the openings 56 required for a single block 46″, as shown in FIG. 3. Such an objective screen will now be incorporated into an electro-optical exposure system comprising a Pierce-type electron gun, a condenser lens and the object mask whereby the pattern of openings corresponding to a block may be used to form a corresponding pattern of electrons onto a lens screen or mask. The electron image formed by the object screen is focused repeatedly onto the surface of the lens screen in a line-by-line manner to form each of the blocks in a 32 × 32 array thereof.

In particular, the object screen will be approximately 5mm square, and contain 128 squares in the horizontal direction and 144 in the vertical direction forming an array of 18,432 openings. The projection of this array on the storage target will form one block of $4\mu$, rounded-corner squares on $6\mu$ centers, each of which will be a single $\mu$-cap or one-bit storage element 46′. The object screen will be fabricated by the following procedure:

1. Prepare emulsion-type photographic master plate containing the 144 × 128 array.
2. Transfer image by photolithography to more permanent chromium-clad plates.
3. Transfer image to chromium-clad glass substrate plates by standard photolithographic process and etch chromium to be used as a mask during hydrofluoric acid etch of glass substrate.
4. Deposit copper over etched substrate.
5. Peel, clean, hydrogen anneal and mount copper screen in position in the electro-optical system to be employed to fabricate the lens screen.

The lens screen will be used in the electro-optical system to focus the object pattern on the storage target surface. The image will be formed in polymethyl methacrylate (PMM) on the surface of the storage target to provide masking during subsequent etching of the surface. The lens screen will be a copper mesh with approximately 31 openings per linear inch to provide 32 × 32 (1024) blocks of the object pattern on the storage surface and will be fabricated by the technique described for the object screen, that is, employing photolithography etching, metal deposition and annealing.

Silicon-wafer storage target 40 will be designed and fabricated as summarized in the following steps. This structure, using silicon substrate, not only has a significant cost advantage over other structures such as $Mo/Al_2O_3/Mo$ on sapphire but also allows use of clean rooms, silox reactors and photochemical facilities and other equipment presently employed in microelectronic circuit design and fabrication. Experience gained in this field will greatly simplify fabrication of the storage targets and minimize experimental aspects that might otherwise be mandatory.

FABRICATION STEPS

1. Clean and chemically polish 111 oriented, 1.5 ohm-cm p-type silicon wafers about 10 mils thick and 2-inch diameter.
2. Form silicon dioxide ($SiO_2$) layer by thermal oxidation in steam at about 1200°C and subsequent $SiO_2$ deposition by thermal decomposition of silane to $3.5\mu$ thickness on one side of the wafer.
3. Vacuum vapor deposit ~1000 A of molybdenum on the $SiO_2$ surface.
4. Apply ~1500 A of PMM, bake, expose to pattern in electro-optical lens system, develop, harden, and argon ion sputter etch pattern.
5. Tantalum fluoride vacuum etch at 805°C to leave ~20,000 A of $SiO_2$ between the bottom of the etched cavity holes and the conductive Si substrate.

Further, the bonding pads 48*a* and 42*a* as shown in FIG. 2 may be illustratively gold-plated and a second such pad may be provided for each conductor 42 and 44 for redundancy and high reliability. Further, a layer or strip 50 of a suitable insulating material such as silicon dioxide deposited to a thickness of approximately 5000 Angstroms is disposed over the bar 48 and the conductive members 48*b* to permit overpass of the positioning tabs 44*b*. The back surface of the silicon substrate 52 may have two gold-plated bonding pad areas (not shown) which are electrically connected to the conductive grid formed by the conductive layers 48*b*.

With respect to FIGS. 1 and 2, the operation of the CRT storage tube 10 will be described with respect to accessing a desired capacitive, storage element, and to writing, reading and erasing information thereon. The mode of writing is known typically as "equilibrium writing", which requires small changes in voltages on a relatively small capacitor. This mode of writing and reading can be used for binary or gray scale operation, using either destructive or non-destructive reading.

With respect to FIG. 1, the computer or other control means provides to the electron beam address circuit 60 signals indicative of the horizontal and vertical addresses. For example, the address signals may indicate that it is desired to write on that storage member 46 (see FIG. 2) which is located in the sixth line down and the tenth line over in the array. The steady state condition imposed upon the horizontal and vertical deflection coils is such that the electron beam 20 is located in the upper left-hand corner of the array of members 46, as seen in FIG. 2. The electron beam 20 is disposed in the "on" condition as by applying a suitable positive voltage to the control grid 18. Initially, upon application of the vertical and horizontal address signals, the vertical deflection circuit 64 is triggered and the electron beam 20 moves down the left side of the storage target 40 scanning the vertical positioning tabs 42*b*. The beam 20 is attracted by the +10V voltage imposed on the conductor 42 and a signal is generated due to the current received from the beam as it is scanned across each bar 42*b*. As shown in FIG. 1, the signal thus generated is applied from the bar 42 through the terminal 41a to a vertical counter 66, which counts the pulse-like signals received to provide an output to a vertical comparator 62, indicative of the number of pulses received and therefore the vertical position of the electron beam 20. The vertical address also is applied to the vertical comparator 62. In this mode of operation, when the comparator indicates a correspondence between the vertical address signal 6 and the output of the vertical counter 66 corresponding to 6, an output is derived from the vertical comparator 62 to inhibit the vertical deflection circuit 64. At this point, the electron beam 20 is disposed at the sixth vertical bar down, as shown in FIG. 2. When the vertical scan has completed its counting and has stopped, the vertical comparator provides an output which is used not only as the vertical inhibit signal, but also as a horizontal initiate signal to trigger a horizontal deflection circuit 68. The horizontal deflection signals generated by the circuit 68 are applied to the horizontal deflection coil 58 whereby the electron beam 20 is moved horizontally as shown in FIG. 2 to scan the horizontal positioning tabs 44b. As the electron beam 20 is scanned horizontally, pulse-like signals are derived from the bar 44, in a manner similar to that described above, and applied through the terminal 41b to the horizontal counter 72 to provide an output corresponding to the number of horizontal tabs 44b scanned and therefore the horizontal position of the electron beam 20. The horizontal address signal is applied to a horizontal comparator 70, which responds to a correspondence between the horizontal address and the output of the horizontal counter 72 to provide a horizontal inhibit signal to the horizontal deflection circuit 68, whereby the electron beam 20 is brought to a stop at the desired horizontal position, e.g. the tenth column over in the array of storage members 46.

Assuming that the selected storage member 46 is to be erased, the switch 74 is set to its first position, as indicated by the numeral 1, whereby an erase voltage is applied to the conductive grid formed by the layer 48b and to the silicon substrate 52. As mentioned above, the silicon substrate 52 and the layer 48b are interconnected. The various potentials applied or developed upon the storage target 40 are indicated below in Table I:

TABLE I

| | Cathode Potential = O V A | B | C | Difference |
|---|---|---|---|---|
| 1. Prime/Erase | +15 V | 0 | +15 V | 15 V |
| 2. Write | +40 V | +25 → +30 | +40 V | 10 V |
| 3. Read | +10 V | −5 V* | +10 V | |

*The capacitive elements that have been written on will be O V and the ones which have not been written on will be −5 V with respect to cathode.

With respect to Table I, the numerals 1, 2 and 3 correspond to the positions of the switch 74 and the labels A, B and C, respectively identify the potentials imposed or developed respectively upon the silicon substrate 52, the storage surface 47 of the capacitive storage element 46' and the conductive layer 48b forming the conductive grid. In a prime/erase mode of operation, the target substrate 52 and the conductive layer 48b are set at +15 V with respect to the cathode of the electron gun 16. This can be done while the electron beam is being located at the corner of the storage member 46. Since the surface 47 to be addressed is below the first crossover for secondary emission, the dielectric surface 47 will charge to cathode potential and stop charging. The storage member 46 is scanned under these conditions with a steady state beam which has sufficient current level to erase any residual charge that may be present. The beam is turned off and returned to the upper left-hand corner of the member 46 for writing.

In a write mode of operation, the layer 48b and the target substrate 52 are set to a +40 V level by setting the switch 74 to its second position. This can be done very quickly and easily inasmuch as the total capacitance of the target to the adjacent elements will be approximately 50 picofarads. Under these conditions, the secondary emission surface 47 will now be set at 25 V (15–40 V) with respect to cathode. This will be above the first crossover point for secondary emission and hence a gain in charge will be realized when electrons from the beam strike that surface. The beam will be modulated by a signal applied to the control grid 18 and scanned across the capacitive storage elements 46' of the block 46. During those periods of time when the beam contains electrons, those elements addressed will emit secondary electrons which charge the element 46' more positive than the 25 V potential level it attained when the 40 V was applied to the whole target. These secondary electrons will be collected on the wall electrode 30 of the tube which will have a potential of approximately 150 V. The potential level that the capacitive storage element 46' arrives at will be a function of the number of beam electrons and this dwell time on an element. Since the scanning rate and thus the dwell time on an element is fixed, the beam current will be gated to a level that will permit a charging of the capacitive storage element 46' to approximately 5 V above its reference level (25 V), during the dwell time of the beam on that element. The capacitive storage elements 46', which have had no electrons land, are charged to 25 V and those which have been bombarded are charged to 30 V with respect to cathode. The voltage level on the conductive layer 48b and the target substrate 52 is now reduced to +10 V with respect to cathode. The elemental storage elements 46' that were at 25 V are now at −5 V and those elements 46' that were bombarded to a 30 V level are now at 0 V.

The reading of the stored charges is performed by addressing the target 40 with a steady state beam return beam by disposing the switch 74 to its third position. When the beam addresses the areas of 0 V charge, the electrons will land on the 10 V metallized surface and the current returned to the electron multiplier assembly will be essentially zero. When the beam addresses a −5 V level, nearly all of the electrons will be returned to the electron multiplier. As explained above, the return beam of electrons is multiplied successively by the elements 20 and collected upon the electrode 24 to provide an output varying from a minimum to a maximum dependent upon the charge stored upon each of the capacitive storage elements 46'.

Figure 5:
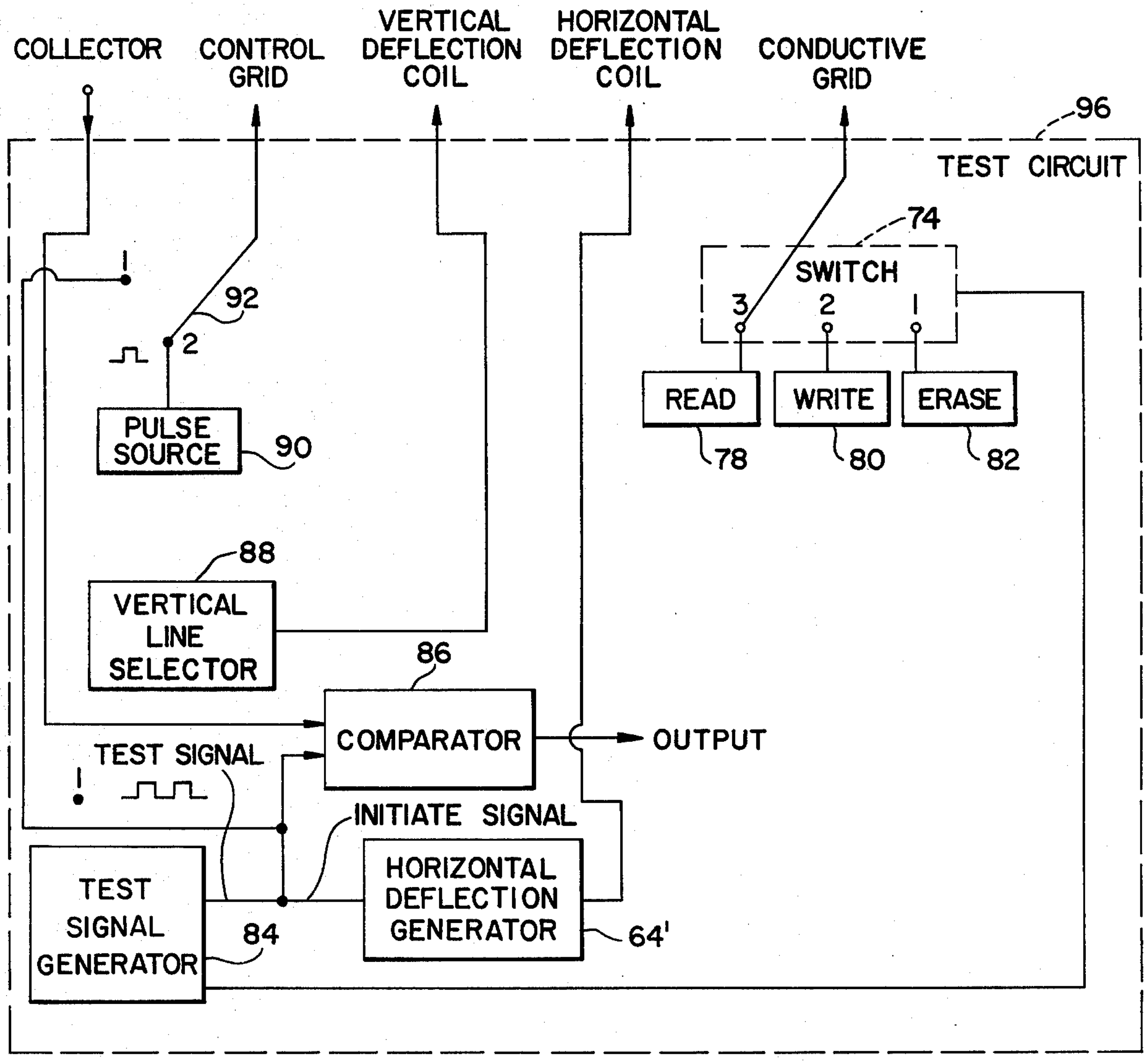
FIG. 5 is a schematic diagram of a test circuit for determining which of the capacitive elements of the target of FIG. 2 are inoperative and for removing the corresponding positioning tabs of those lines in which defective capacitive storage elements are found.

There will now be explained with respect to FIG. 5 a significant aspect of this invention, whereby the inoperative storage elements are detected and the positioning tabs corresponding to that line in which a defective or inoperative storage element is found, are removed. FIG. 5 does not show the CRT storage tube 10, but it is understood that the various electrodes of the tube 10 as shown in FIG. 1 are connected in the following manner. The input connection, marked "collector" is connected to the collector electrode 24. The terminal of the test circuit 96 marked "control grid" is connected to the control grid 18 of the electron gun whereby the intensity of the electron beam may be varied in a manner to be explained. Further, the outputs noted vertical deflection coil and horizontal deflection coil are connected to the vertical and horizontal deflection coils 56 and 58, respectively, and the terminal marked "conductive grid" is connected through the terminal 41*c* (see FIG. 1) to the conductive layer 48*b* comprising the conductive grid (see FIGS. 2 and 4).

Initially, the storage target 40 to be tested, is erased in a manner as explained above by disposing switch 74 to its first position. Thereafter, a test signal provided by a test signal generator 84 is applied through a switch 92 disposed in its first position to the control grid 18, whereby the electron beam 20 is modulated in accordance with the test signal. As illustratively shown in FIG. 5, the test signal may assume the shape of a series of pulses varying between a minimum (0) and a maximum (1). Next, the switch 74 is disposed to its second position whereby the surface 47 is placed at a potential such that secondary emission in response to the incident electron, is effected at a ratio greater than unity. Further, there is included a vertical line selector 84 comprising by the way of illustration, a variable potential source that may be manipulated by the operator and an accurate voltmeter, whereby the potential applied to the vertical deflection coil 56 may be accurately determined to thereby set the electron beam adjacent a particular horizontal line of storage members 46 to be tested. Then, the operator causes the test signal generator 84 to commence applying its test signal to the control grid 18 and to the horizontal deflection generator, which in response thereto generates a horizontal deflection signal whereby the electron beam is scanned horizontally across the selected line. In this manner, charges of a minimum and of a maximum value are written on alternate capacitive storage elements 46' within the selected horizontal line.

In order to determine whether the test signal has been written correctly upon the capacitive storage elements, i.e. whether such elements are operative or inoperative, the operator causes the test circuit to readout the line that has just been written and to compare the signal as derived from the collector electrode 24 with the test signal as generated for a second time by the generator 84. In particular, the operator causes the test signal generator 84 to generate its test signal for a second time and disposes switch 74 to its third position, whereby a reading operation is effected in a manner as described above. Again, the horizontal deflection generator 64' is caused to generate a horizontal sweep signal to cause the electron beam to sweep over the selected line of storage members. The output signal derived from the collector electrode 24 is applied to a comparator 86 in synchronism with the test signal. The comparator 86 may illustratively take the form of a digital adder; in such an embodiment, the comparator provides a 0 output if the read-out signal and the test signal are the same, but will provide a 1 signal if a particular storage element does not provide the correct output. The comparator output may be applied to a suitable warning device whereby the operator is made aware of an inoperative, capacitive storage element.

Upon detection of an inoperative storage element, the operator removes the vertical positioning tab 42*b* in a manner now to be described. First, the operator sets the vertical line selected 88 to apply a voltage to the vertical deflection coil whereby the electron beam 20 is disposed upon the positioning tab 42b corresponding to the line in which a defective element was discovered. Next, the operator throws the switch 92 to its second position and causes a pulse source 90 to generate a pulse of selected potential and pulse width; this pulse is applied to the control grid 18 to increase the electron density of the beam 20. By increasing the electron density, the beam 20 is able to erase the selected positioning tab 42*b* by sublimation. Thus, in the normal operation of addressing the storage elements upon the target 40, when the electron beam is brought to that line having a defective element therein, no signal is generated as the beam is swept past that line in which a defective element was located, because its positioning tab 42b has been erased. Instead, the electron beam 20 continues to scan to the next line, which has a positioning tab 42*b* to provide a feedback signal to the electron beam address circuit 60.

The sublimated material will deposit on various elements within the tube 10. However, total mount of material deposited will be so small that it will not create any problems, for example leakage. In one illustrative embodiment of this invention, the positioning tabs 42b were made of a suitable conductive material such as copper, being deposited to a depth of 1000 A and a width of $4\mu$. A signal pulse as derived from source 90, having a width of normally $50\mu$ sec. and a potential of 20 KV is sufficient to erase such a positioning tab 42*b*.

Thus, there has been described with respect to the enclosed drawings the apparatus and method for facilitating the manufacture of a low-cost, high-information density storage device, wherein each of its storage elements is operative. Further, this invention permits the programming of that memory without having special steps in the program to take into account inoperative storage elements and lines. Further, a storage element tested as described above is interchangeable in a variety of CRT storage tubes without a change in its corresponding programming or control techniques. It is further contemplated that if for any reason a storage element of a target as described, becomes defective in the course of operation, the operator may readily erase that positioning tab corresponding to the defective storage element, to again provide a target wherein each storage element is operative.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting

What is claimed is:

1. A method of providing a high-information density, storage device having a plurality of storage elements disposed in a matrix of lines and rows, wherein each of the addressable storage elements is operative, said method comprising the steps of:

a. providing each line of the storage elements with a positioning tab disposed in a defined relationship therewith;

b. determining whether the storage elements within a selected line are operative or inoperative; and c. if a selected number of storage elements within a selected line is not operative, removing the positioning tab corresponding to that selected line.

2. The method as claimed in claim 1, wherein in step (b), a test signal is stored upon the storage elements within the selected line, and the stored test signal is read-out from the storage device.

3. A method as claimed in claim 2, wherein in step (b), the read-out signal from the storage elements of the selected line is compared with the original test signal to determine whether any of the storage elements within that selected line is operative or inoperative.

4. The method as claimed in claim 1, wherein the storage device comprises an electron gun for emitting and directing an electron beam onto a storage target comprising the plurality of storage, wherein in step (b), the electron beam is scanned across a selected line of storage elements to store thereon a predefined pattern of charges.

5. The method as claimed in claim 4, wherein in step (b), the electron beam is subsequently scanned across the selected line to derive an output signal indicative of the charges stored upon the storage elements of the selected line.

6. The method as claimed in claim 5, wherein in step (b), the output signal indicative of the stored charges is compared with the pattern originally stored thereon to determine whether the storage elements of the selected line are operative or inoperative.

7. The method as claimed in claim 4, wherein in step (c), the electron beam is directed onto the positioning tab corresponding to that selected line having a specified number of inoperative storage elements therein, and the current density of the electron beam is increased to such a level whereby the positioning tab of that selected line is removed.

8. Apparatus for testing and manufacturing a storage device having a plurality of storage elements disposed in a matrix of lines and rows, each line of storage elements having a positioning tab disposed in a fixed relationship therewith, said apparatus comprising:

a. means for generating a test signal to be written upon a selected line of the storage elements;
b. means for reading and writing the test signal upon the selected line of storage elements;
c. means for comparing the original test signal with the signal as read out from the selected line, to determine whether the storage elements of the selected line are operative or inoperative; and
d. means for removing the positioning tab corresponding to that selected line having a given number of inoperative storage elements therein.

9. Apparatus as claimed in claim 8, wherein said means for reading and writing comprises an electron gun for emitting and directing an electron beam onto said storage device, said storage elements being capable of storing a charge thereon.

10. Apparatus as claimed in claim 8, wherein said comparing means is responsive to the test signal as derived from said generating means and to the signal as derived from said means for reading and writing to determine a coincidence therebetween to determine whether the storage elements are operative or inoperative.

11. Apparatus as claimed in claim 8, wherein asid means for removing comprises an electron gun for emitting and directing a beam of electrons of sufficient intensity to sublimate said positioning tab corresponding to that selected line with a given number of defective storage elements therein.

12. A storage device comprising:

a. a plurality of storage elements disposed in a matrix of lines and rows, said lines of storage elements being addressable or non-addressable;
b. the number of said lines of storage elements exceeding that required to provide a given storage for said storage device;
c. each of said addressable lines having said storage elements that are operative, and a positioning tab disposed in a fixed relationship therewith, the number of operative storage elements with said addressable lines corresponding to the required storage to be stored upon said storage device;
d. each non-addressable line of said storage element in which a selected number of storage elements thereof are inoperative having no positioning tab associated therewith.

* * * * *